(12) United States Patent
Castillo Cervantes et al.

(10) Patent No.: US 10,456,773 B2
(45) Date of Patent: Oct. 29, 2019

(54) NANOSTRUCTURED TITANIA CATALYST WITH STABILIZED ACIDITY AND PROCESS THEREOF

(71) Applicant: INSTITUTO MEXICANO DEL PETROLEO, Mexico City (MX)

(72) Inventors: Salvador Castillo Cervantes, Mexico City (MX); Isidro Mejia Centeno, Mexico City (MX); Jesus Marin Cruz, Mexico City (MX); Policarpo Galicia Gómez, Mexico City (MX); Roberto Camposeco Solis, Mexico City (MX)

(73) Assignee: INSTITUTO MEXICANO DEL PELTROLEO, Mexico City (MX)

( * ) Notice: Subject to any disclaimer, the term of this patent is extended or adjusted under 35 U.S.C. 154(b) by 625 days.

(21) Appl. No.: 14/496,424

(22) Filed: Sep. 25, 2014

(65) Prior Publication Data
US 2015/0087506 A1    Mar. 26, 2015

(30) Foreign Application Priority Data

Sep. 25, 2013    (MX) .................... MX/a/2013/011005

(51) Int. Cl.
*B01J 21/06*    (2006.01)
*B01J 37/03*    (2006.01)
(Continued)

(52) U.S. Cl.
CPC ............. *B01J 21/063* (2013.01); *B01J 23/30* (2013.01); *B01J 35/0013* (2013.01);
(Continued)

(58) Field of Classification Search
CPC .............. C01P 2004/03; C01P 2004/04; C01P 2004/13; C01P 2004/16; C01P 2004/34; C01P 2004/50; C01P 2004/61; C01P 2004/62; C01P 2004/64; C01P 2002/72; C01P 2002/82; C01P 2002/84; C01P 2002/85; Y10T 428/24058; Y10T 428/298; Y10S 977/762; Y10S 977/773; Y10S 977/811; Y10S 977/896; Y02E 60/327;
(Continued)

(56) References Cited

U.S. PATENT DOCUMENTS 6,034,203 A    3/2000 Lustig et al.
2006/0078726 A1*    4/2006 Antonio ................. C01G 23/04
                                              428/328

FOREIGN PATENT DOCUMENTS

CA    1156210    11/1983
WO    2005/105674    11/2005
(Continued)

*Primary Examiner* — Melvin C. Mayes
*Assistant Examiner* — Smita S Patel
(74) *Attorney, Agent, or Firm* — Dickinson Wright PLLC

(57) ABSTRACT

The present invention is directed to a process for obtaining a nanostructured titania catalyst with stabilized acidity through the sol-gel method and hydrotreatment and thermal activation; constituted basically by titanium oxide, specially characterized of being as nanostructures in its evolution nanocrystals-nanotubes-nanocrystals, that gives special physicochemical properties such as high specific area, purity and phases stability, acidity stability and different types of active acid sites, such as a capacity to disperse and stabilize metallic particles with high activity mainly in catalytic processes.

23 Claims, 13 Drawing Sheets

(51) Int. Cl.
    *B01J 37/06*          (2006.01)
    *B01J 37/08*          (2006.01)
    *B01J 23/30*          (2006.01)
    *B01J 35/00*          (2006.01)
    *B01J 35/10*          (2006.01)

(52) U.S. Cl.
    CPC ....... *B01J 35/1019* (2013.01); *B01J 35/1061* (2013.01); *B01J 37/036* (2013.01); *B01J 37/06* (2013.01); *B01J 37/08* (2013.01)

(58) Field of Classification Search
    CPC ........... C01B 6/02; C01B 6/24; C01B 3/0026; C01B 3/0031; C01D 13/00; B82Y 40/00; B82Y 30/00; B32B 2311/18; B32B 18/00; C01G 23/003; C01G 23/0047; C01G 23/04; C01G 23/08; C01G 23/053; B01J 35/0013; B01J 35/1019; B01J 35/1061; B01J 37/036; B01J 37/06; B01J 37/08
    See application file for complete search history.

(56) References Cited

FOREIGN PATENT DOCUMENTS

| | | |
|---|---|---|
| WO | 2006/019288 | 2/2006 |
| WO | 2007/027079 | 3/2007 |
| WO | 2007/141590 | 12/2007 |

\* cited by examiner

NANOSTRUCTURED TITANIA CATALYST WITH STABILIZED ACIDITY AND PROCESS THEREOF

CROSS-REFERENCE TO RELATED APPLICATION

This application claims the benefit and priority under 35 U.S.C. § 119 to Mexican Patent Application No. MX/a/2013/011005 with a filing date of Sep. 25, 2013, the disclosure of which is incorporated herein by reference in its entirety.

FIELD OF THE INVENTION

The present invention is related to the process for obtaining a nanostructured titania catalyst with stabilized acidity, designated "TNT-IMP"; produced by a sol-gel method, hydrotreatment and thermal activation. The catalyst is constituted basically of titanium oxide, especially characterized by nanostructures in its evolution from nanocrystals to nanotubes to nanocrystals. The process provides special physicochemical properties such as high specific area, purity and phase stability, acidity stability and different types of active acid sites, such as a capacity to disperse and stabilize metallic particles with a high activity mainly in catalytic processes.

BACKGROUND OF THE INVENTION

Titania, titanium oxide (IV) or titanium dioxide is a chemical compound with a $TiO_2$ formula. Among others, it is used in heterogeneous catalysis processes as a support and/or a catalyst.

Titanium oxide (IV) $TiO_2$, is found in nature in various forms:
 rutile (tetragonal structure),
 anatase (tetragonal structure), and
 brookite (orthorhombic structure).
 It has been formed into the following nanostructures:
 nanotubes,
 nanosheets,
 nanofibers, and
 nanowires.

$TiO_2$ has many advantages as semiconductor material, such as a wide interval of Energy bandgap (Eg), high oxidizing power, biological and chemically inert power and its non-toxicity.

The catalytic properties of $TiO_2$ widely depend on its chemical and physical properties, and determine its texture and morphology characteristics and specially its dimension and crystalline phase. Specifically, the dimension in titania represents a huge factor in its catalytic properties, for example nanostructured titania or $TiO_2$ nanocrystals are actually a reference point for its applications, being the major catalysis field.

Also, the properties inherent to nanostructured titania or nanometric crystal size are related to, if the crystal size is decreased, the increase of the surface area is achieved with its corresponding dimension, in the distribution of diameter and pore volume. Actually, the nanostructured materials, in its version as: nanocrystals, nanotubes, nanofibers, nanospheres, nanosheets, nanowires, are the new alternatives and opportunities for its application as materials that have a promising efficiency in a great variety of fields. These nanostructured materials have fundamental exceptional properties in its special physicochemical properties that give special catalytic, electronic, magnetic, mechanic and optic properties.

The titania nanotubes were discovered in 1990. The main applications were in photocatalysis and in solar cells to produce energy. In this investigation, it was found that titania nanotubes have a major surface area and interfacial transference speed of the load compared with $TiO_2$ nanocrystals. For example, it was found that the positive transference of the load along the nanotubes could reduce the recombination of the hole-electron pair formation (Eg), allowing them to be highly efficient in photocatalytic decomposition and in photocells compared with $TiO_2$ nanoparticles.

On the other hand, the titania synthesis with specific structure characteristics (particles, fibers, sheets, wires, tubes, etc.) and size (nano), and the formation mechanism, are the most important two points in the cutting-edge technology related to titania. Actually, $TiO_2$ nanowires, nanotubes and nanofibers synthesis routes are contemplated through condensed electrochemistry and chemistry that are under investigation.

In the last decade, the methods used for titania nanotubes synthesis are: Chemical Vapor Deposition (CVD), anodic oxidation and humidity chemistry (sol-gel and hydrothermal methods). In all of them, the objective is to obtain special nanotubes arrangements with better characteristics of surface area and pore volume and with specific structure arrangements. Among the more recent methods of condensed chemistry for preparing titania nanotubes are the following: via surfactants, synthesis via alumina as a quencher, irradiation via microwaves, electrochemical synthesis and new routes of hydrothermal method.

Each above-mentioned method has advantages and disadvantages in the final characteristics of the obtained titania nanotubes, for example, in the synthesis via alumina as a quencher, it is possible to obtain uniform and well aligned nanotubes. Nevertheless, they have a larger size due to alumina porosity that serves as a cast, obtaining pore diameters of up to 50 nm. Generally the walls are constituted of $TiO_2$ nanoparticles, so that when trying to separate them, sometimes part of them are destroyed. Therefore this method is not practical.

Regarding the method via surfactants, it is possible to obtain titania nanotubes with very small pore diameter and very thin walls. Compared with all other methods, its limitations are based on processes with long and complicated preparation, which greatly increases its cost. The titania nanotubes with a 10 nm size are made through the hydrothermal method starting from titania nanocrystals, but using high sodium hydroxide concentration, where the alkali ions are interchanged by protons to form H-titanates. Different phases are obtained through this method, such as anatase, rutile and brookite that are dependent of the synthesis temperature. In this method, the mechanisms and control of the formation ratio of the above-cited crystalline phases that seem to show high dependence of the thermal treatments are still being investigated.

In preliminary studies on formation of titania nanotubes starting with titania nanocrystals through hydrothermal methods nanotubes with diameters of 8-10 nm were obtained, with lengths of 50-200 nm and specific areas of 380 to 400 $m^2/g$, where the bonds Ti—O—Ti, change to Ti—O—Na. In this condition, the anatase phase exists in a metastable condition as a "soft chemical reaction" at low temperature. As the following step in this method, washings with HCl are carried out, for the ionic interchange of Na for H and forms again Ti—O—Ti, continuing washing with deionized water to form Ti—OH or Ti—O°°°°H—O—Ti species, these materials have very specific applications, as in photocatalysis.

Some investigators take the position that the hydrothermal treatment is the fundamental step for obtaining titania nanotubes with special texture and morphology characteristics, leaving washing on the second place. Nevertheless, other investigators establish the contrary, that is, the washing is a fundamental step for obtaining nanotubes. Other groups comment that in each case the nanotubes are obtained for different applications. Among the main existing debates of using one or another synthesis method, is what type of crystalline structure forms of nanotubes can be obtained, as can be i) anatase/rutile/brookite $TiO_2$, ii) lepidocrocite $H_xTi_{2-x}[\ ]_{x4}O_4$ (x-0.7, [ ]: vacancies), iii) $H_2Ti_3O_7/Na_2Ti_3O_7/Na_xH_{2-x}Ti_3O_7$, iv) $H_2Ti_4O_9$. Also, it is established that starting with the anatase phase, nanotubes are easily formed compared with those when the nanotubes start from rutile. Another very important factor is the size of the crystal of the starting material.

According to the present invention, it is concluded that starting from titania powder in the anatase phase, the nanotubes are more easily obtained with better arrangement and structure size as compared with starting with the rutile phase. Furthermore, when these nanotubes are hydrated, they convert into hydrated hydrogen titanates ($H_2Ti_3O_7.nH_2O(n<3)$), and have special morphology such as: multi-walls and order spacing of 0.75-0.78 nm.

The studies propose that obtaining tri-titanates nanotubes through hydrotreatment are made by two mechanisms: i) starting with the titanium dioxide and a concentration solution of sodium hydroxide (NaOH), obtaining $Na_2Ti_3O_7$ as an intermediate product, converting them into tri-titanates in form of nanosheets $(Ti_3O_7)^{2-}$, where this formation depends of the NaOH concentration to be finally converted into titania nanotubes. Nevertheless, not all $H_2Ti_3O_7$ are converted in titania nanotubes. ii) starting with sodium lepidocrocite $Na_2Ti_3O_7$, that tend to form titania nanocrystals, but are not stable and also influences the $Na^+$ ion concentration to form nanocrystals and to finally form titania nanotubes. It is said that the expansion of titania particles originates the formation of $Na_2Ti_2O_4$ $(OH)_2$, where depending on the concentration of NaOH solution, the short Ti—O bonds slide and expand to form linear bonds (one-dimensional), $O^-$—$Na^+$—$O^-$, to produce bidimensional flat fragments, whereas nanotubes already, would eventually establish covalent bonds.

On the other hand, an important factor in the application of hydrothermal treatment, is related to the temperature, where it is established that when titania is reacted at a high temperature (250° C.) in presence of a NaOH solution, $Na_2Ti_2O_5°H_2O$ is formed. In order to remove $Na^+$ ions, it is washed with HCl and the formation of sheets, in this case nanosheets, is started.

Specifically, the main factors that influence the formation of titania nanotubes with special physicochemical characteristics are those described below, in the order of sequence of the hydrothermal method:

Synthesis precursors
Rutile
Anatase
Degussa P25 nanoparticles
$Ti^{IV}$ Alkoxide
$SiO_2$—$TiO_2$ mixtures In the synthesis of titania nanotubes through hydrothermal method, the starting reagents have a very important role, for example, starting from normal powder of an anatase/rutile mixture or anatase/rutile nanocrystals; or titanates sheets ($Na_2Ti_3O^7$); or titanium salts ($TiCl_4$); or titania alkoxide ($Ti^{iv}$); or $TiO_2$ doped anatase; or $SiO_2$—$TiO_2$ mixtures. Generally, the titania nanotubes with external diameter of 10 to 20 nm can be obtained starting with titania powders with big particle size, such as: $TiO_2$-rutile, $TiO_2$ Degussa (P25) or $SiO_2$—$TiO_2$ mixtures. Also, taking the crystal size of the starting material as a reference, starting from $TiO_2$ rutile with average particle size of 120 to 200 nm and high concentration of NaOH (10N) at 150° C. for 48 hours, multilayer and "open-ended" nanotubes are obtained, with an internal diameter and length of 2-3 nm and 50-200 nm, respectively, furthermore, with an uniform winding. Similarly, commercial titania was used such as: $TiO_2$ Hombikat UV100 and $TiO_2$ BCC100, with which the nanotubes with internal and external diameter of 3-6 and 7-10 nm, respectively, were obtained and with a length of about 400 nm.

In recent studies, other types of materials were used, such as: i) fresh gels, ii) P25 Powders, iii) $TiO_2$ treated at 500° C. and all of them were treated with hydrothermal method. Nanotubes with lengths from 50 to 70 nm and with average diameter of 10 nm were obtained using fresh gels. The nanotubes made of P25 showed average diameters of 50-300 nm and nanotubes with various hundreds of nanometers and with an average diameter of 15 nm were made with $TiO_2$.

Hydrothermal Method
NaOH Normality/Starting material ($TiO_2$) relation
Operation conditions (time, stirring)
Synthesis temperature The temperature has a very important role in the hydrothermal method, for example, it is possible to form titania nanotubes in an interval of 100 to 180° C., starting with $TiO_2$ powder, that can be a mixture of anatase/rutile phases with a performance of 80 to 90% and if it is out of the above-mentioned interval, the formation of nanotubes decays. Also, there is a combination of a temperature interval with NaOH concentration and the particle size of the starting titania, for example, at a temperature from 100 to 200° C. and NaOH 10N, starting with $TiO_2$ nanoparticles, the specific area, diameter and pore volume of the obtained nanotubes are increased.

Another combination of variables of the hydrothermal method is the combination of temperature and aging time, for example when the aging time is of 72 hours at 150° C., a greater performance in the obtention of nanotubes with a defined crystallinity grade (titanates) is obtained.

Based on the above, most investigations define that with a hydrothermal method at a temperature less than 100° C., the nanotubes are not formed, only nanosheets can be obtained through this method; also, it is said that the determining step to obtain nanotubes is starting with sodium titanates that appear at 70° C., as nanosheets, which, incrementing the temperature at 90° C., convert into nanofibers.

Through the hydrothermal method at a temperature of 160°, the specific area and the pore volume in nanotubes decreases due to the interlayer spaces limitation and due to the fact that the sodium ions are not replaced by the hydrogen in the washing process with hydrochloric acid. As well, at a temperature of 170° C., the nanobars occur also with decrease in the area and in the pore volume.

Pretreatment-sonication
Nanoparticles dispersion
Inhibition of crystal growth
Particles homogeneity
Influence in length distribution
Synergy in reactions The sonication treatment in nanostructures is commonly used in nanotechnology to disperse nanoparticles, especially in liquid media. Referring to titania nanotubes, the length is controlled by means of the hydrothermal method. The sonication speed depends on the nanoparticles dispersion for the intermolecular reaction among the $TiO_2$ particles and NaOH solution, besides of rendering the system more homogeneous.

The migration of $OH^-$ and $Na^+$ ions can be carried out through the sonication treatment all along the holes restricted between the particles of the used titania precursor that will help not to delay the nanotubes formation. Other property attributed to the sonication treatment is that the obtained nanotubes with an average length of 3 to 9-fold the nanotubes without treatment also increases its specific area.

On the other hand, the irradiation to a different magnitude as the interval of 100 W to 280 W and up to 380 W impacts the morphology of the nanotubes, for example, small diameters (1 to 14 nm) are obtained with magnitude from 100 and 280 W and with high magnitude (380 W) it increases substantially, from 199 to 600 nm. Also, the sonication during the preparation of nanotubes helps to avoid the growth of $TiO_2$ crystals. Definitely, the sonication treatment helps to obtain nanotubes with greater length, with small diameters and high specific area.

Thermal Treatments
Effect on the structure of the phases
Titanate nanotubes microstructures
Transformation of phases
Titanate nanotubes in anatase phase The thermal post-treatments after applying the hydrothermal method have an important effect in the final morphology of the nanotubes. It is possible to modify the nanostructures obtained with hydrotreatment with calcination treatments, for example, it is possible to transform the titanates again into $TiO_2$ anatase phase, with heat; therefore, nanotubes were stabilized up to a temperature of 500° C. with 8 to 22 nm diameters, starting with pure anatase. It is important to point out that the temperature has an important role in the crystallinity grade of the titania nanotubes, for example $TiO_2$ powders calcinated at 400° C., give nanotubes with thin walls but its structure is equal to the structure not submitted to this calcination temperature, nevertheless in a range of 600 to 800° C., the nanotubes structure collapsed. Based on the above, the effect obtained increasing the calcination temperature over the crystallinity and nanotubes structures, is permanent, for example, the crystal size is increased from 5 to 30 nm, the average pore size is from 18 to 33 nm, the pore volume is of 0.99 to 0.35 $cm^3/g$ and the specific area is of 220 to 64 $m^2/g$ with a temperature increase of 300 to 600° C.

Generally after the washing process and a calcination temperature greater than 500° C., the structure of the nanotubes is lost, converting it into $TiO_2$ nanoparticles but with a greater size of the crystal that those obtained when are submitted to hydrothermal treatment to transform them into nanotubes; also in nanocrystals submitted at a temperature greater than 600° C., the anatase phase is diminishing and losing to be converted into rutile.

Washing Process
Determines elemental composition
Alignment of the nanotubes specific area A great part of the carried out studies determine that the morphology and dimensions of the nanotubes are determined by the hydrothermal method more than by the washing processes; nevertheless, other studies attributes an important influence, such as the nanostructures or initial phase of the nanotubes, its specific area and greater purity. Based on the above, the interchange of $Na^+$ ions by $H^+$ ions in the washing process increases spaces and furthermore increases the area.

The effect of concentration of HCl is also analyzed. It is said that an interval of optimum concentration is of 0.5 to 1.5 M, where below 0.5M, the withdrawal of $Na^+$ is inefficient and above 1.5M the nanotubes can be destroyed, forming "lumps" with a size greater than 100 nm; nevertheless, in a study carried out with HCl 0.1M at 150° C., the nanotubes were obtained with great efficiency and also the length was decreased. Also, other studied argue that when the $Na^+$ ions are withdrawn, the nanotubes are destroyed or the pore volume substantially diminishes, as well as its specific area. When low concentrations of NaOH are used (0.01M to 0.001M), the length of "open-ended" and multilayer nanotubes was of hundreds of nm with an average diameter of 10 to 30 nm. The combination of $TiO_2$ starting materials and HCl concentration shows an effect, for example, starting with $TiO_2$ rutile and 0.1M of HCl, firstly, the nanotapes are obtained, but not all these nanostructures are converted in nanotubes, therefore, the washing at a greater concentration of HCl is essential if it is desired to increase the nanotubes formation.

The XRD technique can be applied in qualitative analysis as well as in quantitative analysis of the $TiO_2$ nanostructures, where by means of these techniques, it is possible to identify the types of nanostructures of which are constituted, its ratio and to determine its dimensions. The previous information can be obtained through the application of fundamental tools, such as: Bragg's law and the Formula for Integrated Intensity. The information that can be obtained is as follows:

Space group and geometry of the elemental cell obtained from the collection of Bragg's angles (2θ); as well as with these values, the qualitative identification of the crystalline phases can be carried out;

Determination of the crystal size through the peak broadening method. The crystalline purity can also be determined is with this method.

Atomic position in the elemental cell, through the measuring of the Integrated Intensity of the peaks, which also allows to carry out the quantitative analysis of the phases present in the sample; and Texture analysis, residual tensions and phases diagram measuring.

On the other hand, by means of Fourier transform infrared spectroscopy (FTIR), it is possible to identify the operational groups in $TiO_2$ nanostructures, such is the case of identification of OH groups, which determines the hydroxylation grade, important characteristic of titania as catalytic material. The acid surface of the supports and catalysts can also be determined and there are various forms for this determination, such as: $NH_3$ adsorption on the catalyst surface and pyridine adsorption.

Pyridine as widely used as a probe molecule for the identification of both Lewis and Brönsted sites; the pyridine molecule can interact through the ion pair containing the nitrogen (N) with different sites. Generally, the band associated to 1640 and $1540^{-1}$ are associated to Brönsted, meanwhile the 1630 and 1440, 1445 $cm^{-1}$ region is attributed to the coordination of Lewis sites, the band to 1490 is associated to both Lewis and Brönsted sites.

The main bands associated in the interval 1850-1680 $cm^{-1}$ are related to $NH_4$ chemisorbed vibrations in Brönsted sites, the bands located at 1600 $cm^{-1}$ and 1217 $cm^{-1}$ are related to the vibrations of coordinated N—H bonds in Lewis acid sites. Even these two techniques can help us to determine the type of the sites present in the spectra catalyst via ammonium, it is not clear, because they can be placed on the top with other different types of bands that can cause problems for quantifying the real acid sites, contrary to the analysis with pyridine, since this technique is very assertive and allows cleaning the area where there are pyridine adsorbed sites to be able to clearly quantify the sites present in the supports and catalysts.

The determination of bandgap energy or bandgap (Eg) of $TiO_2$ is fundamental to know the activity in the catalytic process and are obtained from the UV-vis spectra en 200-800 nm region. There is fundamental transition in this region, from the valence band to the conduction band, in this case for nanostructures of nanotubes or H-titanates type.

Also, it is important to point out that it is possible to determine the morphology (phases) and the dimensions of $TiO_2$ nanostructures by means of the Transmission Electron Microscopy (TEM) analysis and also, it is possible to obtain the individual diffraction pattern through the selection of a crystal in different micrograph areas, besides of its interplanar corresponding distances with Digital Micrographs program that are compared with classified cards of JCPDS for $TiO_2$ (JCPDS—Joint Committee on Powder Diffraction Standards), determining the structure of the crystal in its corresponding direction (hkl).

On the other hand, the physical and chemical properties of a material are determined by the type of interaction existing among the electrons and among ions and electrons; when reducing the space where the electron can move freely, it is possible that new effects will occur due to the space confinement, what causes the modification of the energetic levels of the electrons within the particles. Based on the above and to the fact that surface to volume ratio is notably increased, the nanotubes have new properties that do not occur nor in great quantity in the material ("bulk"), neither in the fundamental entities constituting the solid.

There are two types of nanotechnology for preparing nanostructured materials:

The "Top-Down" method refers to design of nanomaterials with size reduction (from largest to smallest size) and is based on the mechanisms for obtaining structures in a nanometric scale. This type of nanotechnology has been used in different fields, being the field of electronics the one with greater application; nevertheless, other fields were recently incorporated, such as medicine and environment protection; and The "bottom-up" method that refers to auto assembly, literally from a smallest size to a biggest size and starts with a nanometric structure such as a molecule and by means of a mounting or auto assembly, a greater mechanism than the starting mechanism is created. This focus is considered as the only "real" nanotechnology focus that allows to extremely and accurately controlling the nanometric size of the material.

Some of its properties are:

Increase of the surface area/volume inducing a great increase in the interfacial area of the species on the surface;

Changes in the electronic structure of the species conforming the nanostructure;

Changes in the arrangement (crystalline structure, walls and distances and internal and external diameters, etc.) of the species in the nanotube and presence of defects; and Confinement and quantum-size-effect due to the confinement of the charge carriers within the nanotube.

Among the main patent documents of the state of the art identified as the closest to the present invention are the following:

WO 2006/019288 for "Selective Absorption Material and Application Method Thereof", dated Feb. 23, 2006, José Antonio Toledo and Maria Antonia Cortés Jacome, relates to a method for the selective absorption of nitrogen- and sulfur-bearing compounds contained in different fractions of petroleum hydrocarbons. The solid material used as an absorbent consists of a nano-structured material comprising morphology of nanofibers and/or nanotubes of an inorganic oxide of a metal from group IVB with a high specific surface area of between 100 and 600 m$^2$/g and is not promoted with a transition metal. The material, object of the present invention, also can be used as adsorbents of other contaminants and various materials, characterized because it comprises the following steps:

1. Selective adsorption of nitrogen and/or sulfur compounds of light and intermediate petroleum fractions contacting said charges with a nanostructured $TiO_{2-x}$ material.

2. Nanostructured $TiO_{2-x}$ material with nanotubular morphology, high deficiency of oxygen, beta phase crystalline arrangements and/or JT orthorhombic and/or anatase structure, with or without transition metals.

3. Method for preparation of nanostructured $TiO_{2-x}$ with transition metals. Characterized by a hydrogen titanate and/or mixed titanate from hydrogen and sodium, submitted to an ionic interchange with Cu and Zn oxides.

4. An adsorbent material, such as nanostructured $TiO_{2-x}$, with specific area values from 50 to 500 m$^2$/g and a pore size of 2 and 10 nm.

5. An adsorbent material, such as nanostructured $TiO_{2-x}$ with a orthorhombic structure whose unit cell is described by the space group Pmmn 59, has a peak X-ray diffraction about 10 degrees in a 2Θ scale in the plane (200) and a number of structural layers of 1 to 50.

6. An adsorbent material such as nanostructured $TiO_{2-x}$ characterized having a composition comprised between 0 and 20% by weight of Zn, Cu, Ni, Co, Fe, Ag, Mn, Cr, Mo or W, preferably Cu or Zn.

Where;

$TiO_2$ anatase phase and/or $TiO_2$ rutile phase and/or amorphous titanium hydroxide and/or directly a mineral called rutile are used as starting materials;

Hydrothermal treatment of the previous aqueous solution with stirring between 100 and 250 rpm and at a temperature from 50 and 300° C., to a autogenous pressure in the range of 1 to 50 atm;

Ionic interchange treatment with diluted acid solution from 0.1 to 1M, using organic and inorganic acids, such as: hydrochloric, sulfuric, nitric, hydrofluoric, boric and phosphoric acid or ammonium salts capable of interchanging sodium in a pH range of 1 to 7;

The nanostructured $TiO_{2-x}$ material, classified according to the crystallographic structure determined by X-ray diffraction, such as rutile type $TiO_2$, or anatase and/or mixes of both of them and/or amorphous titania, by its physicochemical properties can be used for the application in the selective adsorption of nitrogen and/or sulfur compounds of petroleum light and intermediate fractions.

WO 2007/141590 for "Sol-gel nanostructured titania reservoirs for use in the controlled release of drugs in the central nervous system and method of synthesis", published on Dec. 13, 2007, Lopéz-Goerne T. refers to a sol-gel nanostructures $TiO_2$ which is biocompatible with brain tissue. In the nanostructured $TiO_2$ of this invention, the pore size distribution, crystallite size and the extent of the crystalline phase distribution of anatase, brookite and rutile can be fully controlled. These materials can be used to contain neurological drugs and can be inserted directly into brain tissue for the purpose of the controlled time release of drugs over a period of from 6 months to three years.

WO 2007/027079 for "Method of preparing a catalytic composition for the hydroprocessing of petroleum fractions", published on Mar. 8, 2007, Toledo J., relates to a method of preparing a catalytic composition comprising at least one non-noble metal from group VIII and at least one metal from group VIB of the periodic table. The catalytic composition has a high specific activity in reactions involving the hydroprocessing of light and intermediate fractions, preferably in reaction involving the hydrotreatment of hydrocarbon steams, including hydrodesulphurization (HDS), hydrodenitrogenation (HDN) and hydro-dearomatisation (HDA).

WO 2007/027079 for "Palladium and nickel modified Mo/Alumina-titania sulfide catalysts on the hydrodesulfurization of 4,6-dimethylbenzothiophene", published on May 15, 2012, Vargas E., relates to the addition of Pd (0.3-0.8% by weight) and Ni (NiO=3.1% by weight), to Mo (MoO3=10.0% by weight) over sulfide alumina-titania (MO/AT) catalysts. The addition of Pd and Ni over MO/AT catalysts has a positive effect producing a sulfide catalyst, approximately 8 fold more active for HDS of the 4,6-DMDBT molecule, favoring the hydrogenation (HYD), promoting the removal of S through hydrogenated partially 4.6-TH-DMDBT compound, producing 3,3-DM-CHB. Furthermore, with an effect between Pd and Ni over the MO/AT catalyst that is greater when the Pd is incorporated in the Ni-MO/AT catalyst, than when the Pd is incorporated into the Mo/AT catalyst.

On the other hand, WO 2005/105674 for "Nanostructured titanium oxide material and method of obtaining same", published Nov. 10, 2005, Toledo A., relates to nanostructured materials comprising titanium oxide ($TiO_{2-x}$, wherein $0=x=1$), having an orthorhombic unknown crystalline structure which is the basic unit in the construction of nanofibers, nanowires, nanorods and/or nanotubes, which are produced from an isostructural precursor comprising hydrogen titanate and/or mixed sodium and hydrogen titanate, corresponding to the hydrogenated, protonated, hydrated and/or alkaline phases of the aforementioned structure, and are obtained from titanium compounds, such as: titanium oxide having a crystalline anatase structure, amorphous titanium oxide, titanium oxide having a crystalline rutile structure and/or directly from rutile mineral and/or ilmenite. The invention also relates to the method of obtaining the inventive materials.

U.S. Pat. No. 1,156,210 for "Process for manufacturing a catalyst or catalysts based on titanium oxide and its application in sulfur synthesis Claus process", published on Nov. 1, 1983, to Dupin refers to a improved process for the obtention of catalysts or catalysts support based on titanium oxide for sulfur synthesis Claus process, characterized because it comprises the following steps:

1) the kneading of a mix containing 1 to 40% by weight of water, up to 15% of conformation additive, from 45 to 99% by weight of a poorly crystallized and/or amorphous titanium oxide in powder showing a fire loss comprised between 1 to 50% by weight, is carried out;

2) the conformation of the mix is carried out; and 3) the mix is dried and afterwards, the products obtained at a temperature of 200 to 900° C. are calcinated.

U.S. Pat. No. 6,034,203 for "Catalysis with titanium oxide", dated Mar. 7, 2000, to Lusting et al. relates to a process, which can be used in oligomerization, polymerization or depolymerization such as, for example, the production of polyester. The process comprises contacting a carbonyl compound, in the presence of a composition, with an alcohol. The catalyst comprises a catalyst having the formula of $Mx\ Ti^{(III)}_y Ti^{(IV)}_y O_{(x+3+4y)/2}$, wherein M is an alkali metal, $Ti^{(III)}$ is titanium in the +3 oxidation state, $Ti^{(IV)}$ is titanium in the +4 oxidation state, x and y are numbers greater than or equal to zero wherein if x equals to zero, y is a number less than ½.

SUMMARY OF THE INVENTION

The technologies previously mentioned and known by the inventors are overcome by the present invention; since none relate to a nanostructured titania catalyst with stabilized acidity of the present invention as well as the process of producing same.

Therefore, it is an object of the present invention to provide a catalyst basically constituted of titanium oxide with the special characteristic of being in form of nanostructure in its evolution as nanocrystals-nanotubes-nanocrystals, which gives special texture and morphologic properties, such as: high specific area, purity and phases stabilization that gives to the catalyst a capacity to disperse and stabilize metal particles with a high activity and selectivity mainly in catalytic processes.

Another object of the present invention is to provide a process for obtaining a nanostructured titania catalyst through the sol-gel and hydrotreatment and thermal treatment method.

Another object of the present invention is to provide a catalyst with high acidity grade and different types of acid sites (Lewis/Brönsted), stabilized at high temperature and with resistance to deactivation by temperature, which gives a specific acidity for catalytic process to the catalyst.

An additional object of the present invention is to provide a process for obtaining a nanostructured titania catalyst where the dimension of the crystal size of titania nanocrystals-nanotubes nanostructures of the catalyst depend on the particular or joint handling of the variables of the sol-gel and hydrothermal methods referring to the sol-gel method, such as; the types of titania metal alkoxides used, the characteristics of the solvents, the alkoxide/water ratio and the media in which the hydrolysis is carried out, that can be acid or basic in the hydrothermal process, the variables such as: concentration of an alkaline base, temperature, aging time and washing conditions and finally the thermal treatment of activation of catalysts.

The process for obtaining the nanostructured titania catalyst with stabilized acidity referred to as TNT-IMP consists of providing a process for obtaining a nanostructured titania catalyst where the dimension of the nanostructure crystal size of the nanocrystals-nanotubes-nanocrystals nanostructures of the titania catalyst depend on the particular handling or joint of the variables of the sol-gel and hydrothermal methods. Referring to the sol-gel method, such as the types of titania metal alkoxides used, the characteristics of the solvents, the relation alkoxide/water and the media in which the hydrolysis is carried out, that can be acid or basic in the hydrothermal process, the variables such as: concentration of an alkaline base, temperature, aging time and washing conditions and finally the thermal treatment of activation of catalysts.

The process for obtaining the nanostructure titania catalyst with stabilized acidity, referred to as TNT-IMP where the drying step at ranges of 70 to 80° C., in periods of time of 4 to 12 hours and the calcination step in a range of 300 to 600° C., in a period of time of 3 to 9 hours, determine the evolution of nanocrystals-nanotubes-nanocrystals structures with special physicochemical properties, giving special characteristics to the TNT-IMP catalyst, such as the capacity to disperse and stabilize active metal particles with high activity and selectivity mainly in catalytic processes.

A TNT-IMP nanostructured titania catalyst with a high acidity grade and different types of acid sites (Lewis/Brönsted), stabilized at high temperature and with resistance to deactivation by temperature, which gives the catalyst a specific acidity for catalytic processes.

DETAILED DESCRIPTION OF THE INVENTION

Figure 1:
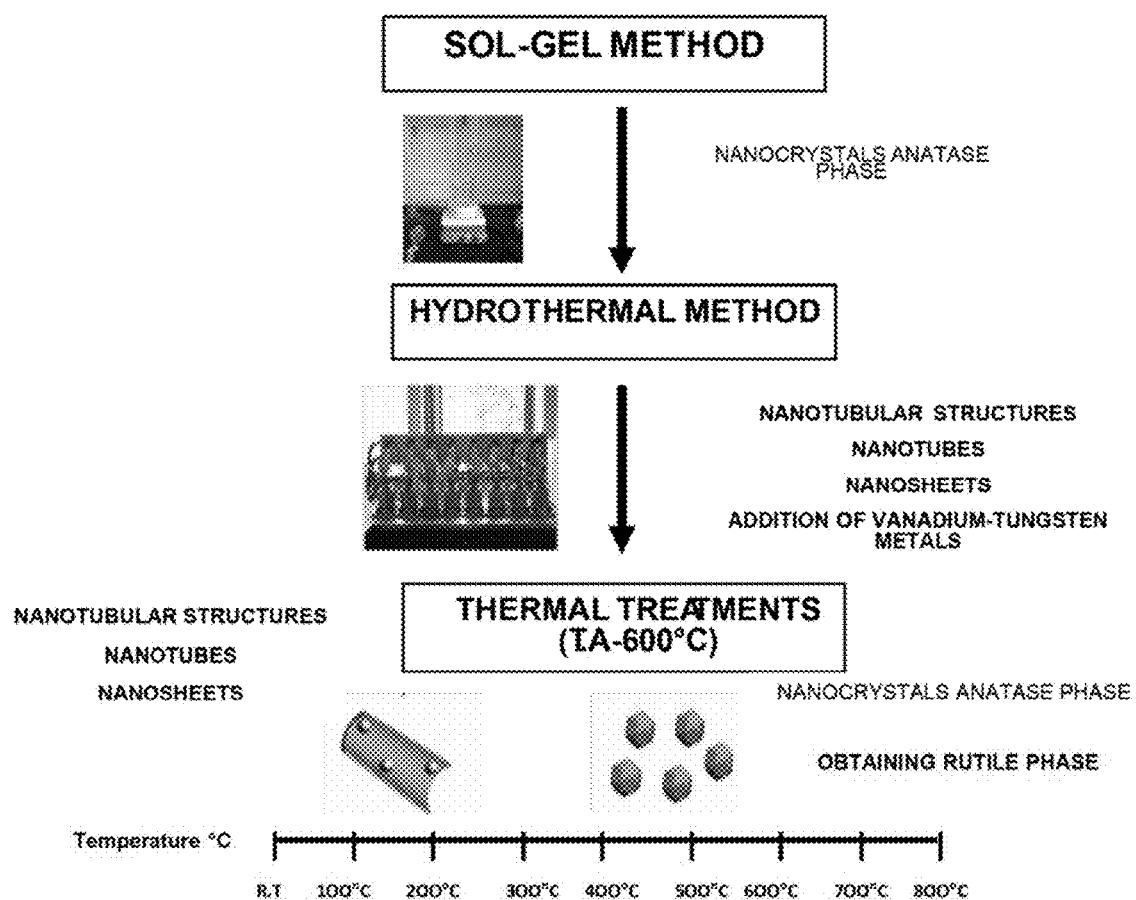
FIG. 1 is a flow diagram of the process for obtaining the TNT-IMP nanostructured titania catalysts stepwise, obtained through the process of the present invention.

The present invention is related to the process for obtaining a nanostructured titania catalyst with stabilized acidity, (referred to herein as TNT-IMP where TNT refers to titania nanotubes); through the sol-gel method and hydrotreatment and thermal activation, that is basically constituted by titanium oxide and has as the main characteristic, the evolution of the nanostructures in nanocrystals-nanotubes-nanocrystals, which gives to the catalyst special texture and morphologic physicochemical properties, such as high specific area, purity and crystalline phases that gives a capacity to disperse and stabilize metallic particles with a special metal-support interaction, giving as a result a high activity and selectivity mainly in catalytic processes.

One aspect of the invention provides a process for producing a titania catalyst. The nanomaterials of the invention generally have a particle size of 1-100 nm, and preferably about 11-15 nm. The catalyst has a nanostructure and can contain an additional metal, such as vanadium and/or tungsten. The vanadium and/or tungsten can be added as metal precursor to the titanium dioxide. The process of the invention produces a nanocrystal titanium dioxide by a sol-gel process. The nanocrystal titanium dioxide is then subjected to a hydrothermal treatment to obtain nanotubes. The hydrothermal process in one embodiment produces titanates, known as titanic acids ($H_2Ti_3O_7$). The titanium dioxide nanotubes are then subjected to a thermal treatment to convert at least a portion of the nanotubes to titanium dioxide nanocrystals.

The titania catalyst in one embodiment is obtained by a sol-gel method, a hydrothermal treatment and a thermal activation. The resulting titania catalyst has a crystalline/amorphous phase of hydrogen titanate, and hydrogen titanate/anatase combination. The amount of the hydrogen titanate and hydrogen titanate/anatase combination can be dependent on the activation temperature. An activation temperature of 100-350.degree. C. can produce a crystalline/amorphous phase containing 95-100 wt %, and preferably 98-100 wt % of hydrogen titanate and further containing 96 wt %/4 wt %, preferably 97 wt %/3 wt % of hydrogen titanate/anatase combination. In one embodiment, an activation temperature of 350-600.degree. C. can produce a crystalline amorphous phase containing 20-33 wt %, and preferably 21-30 wt % of hydrogen titanate, and further containing 22 wt %/78 wt %, and preferably 23 wt %/77 wt % of hydrogen titanate/antase combination.

Applicant found that the solvent used in the sol-gel method is important in obtaining certain properties of the titania. For example, it has been found that a branched alcohol solvent such as 2-propanol produces titania having properties that are different from titania using a linear alcohol such as butanol.

The titania nanocrystals are obtained by the sol-gel method. The titania nanocrystals are then converted to titania nanotubes by the hydrothermal treatment to obtain the catalyst of the invention. The nanocrystals and the nanotubes are titania phases that are susceptible to a phase change by a hydrothermal treatment. In one embodiment, the titania nanotubes are converted again into titania nanocrystals by subjecting to a high temperature. In one example of the invention, the titania nanocrystals are converted to titania nanotubes and then subjected to high temperature to convert the titania nanotubes to titania nanocrystals.

In one embodiment, a metal can be added to the catalyst. Examples of suitable metals include vanadium, tungsten, and combinations thereof. In one embodiment, a vanadium precursor such as an ammonium metavanadate solution or tungsten precursor such as a tungtic acid solution is combined with the titania nanotubes to introduce the metal into the titania nanotubes. The metal can be incorporated into the titania nanotubes in an amount of about 3.5 to 10 wt % based on the weight of the catalyst.

The TNT-IMP nanostructured titania catalyst, obtained through the process of the present invention has advantages over the known catalysts of this type, mainly in the evolution of the nanostructures, its size dimensions related to the thermal treatment and its correspondence with the physical and chemical properties that are determined by the type of interactions existing between ions and electrons of these nanostructures, that gives the catalyst texture specific properties (specific area and pore size distribution) and morphologic properties (crystalline phases), that finally gives specific size and dispersion properties to the active metallic particles incorporated into the nanostructures; the catalyst reaches high activity and selectivity mainly in catalytic processes.

Also, the TNT-IMP catalyst, in the evolution of the nanostructures (nanocrystals-nanotubes-nanocrystals), have specific fundamental acidity properties such as: high stability at high temperature, have active acid sites, such as Brönsted and Lewis type, under the before described conditions, which similarly gives the catalyst a high activity and selectivity mainly in catalytic processes.

The physicochemical properties of the TNT-IMP catalyst depend on three stages; the first stage relates to the particular handling or joint of the variables of the sol-gel method, such as the types of titania metallic alkoxide used; the characteristics of the solvents, the alkoxide/water ratio and media where the hydrolysis is carried out, that can be acid or base. The second stage corresponds to the hydrothermal process to produce nanotubes and handling of variables such as: concentration of the alkaline solution, temperature, aging time and washing conditions. The third stage corresponds to the evolution of nanostructures, that is, the evolution of titania nanotubes to nanocrystals, only by thermal effect, i.e. the calcination process with or without the incorporation of a metal or active metals.

For a better comprehension of the process for obtaining TNT-IMP catalyst, the FIG. 1 shows the flow diagram having the following steps:

First STEP Sol-Gel Method
I). Preparation of an alcohol solution;
II). Solution in acid media;
III). Hydrolysis;
IV) Aging;
V). Drying; and
V). Activation or calcination.

I) Preparation of an Alcohol Solution.

It can be considered as the preparation of the feeding charge and consists of the addition of a reflux system with stirring of a titanium alkoxide of three or four branched or linear carbons in an alcohol solution, with three or four linear or branched carbon alcohols such as 2-propanol and 1-butanol.

II) Solution in Acid Media.

It consists of adding an acid to the alcohol solution obtained in step I) controlling pH from 1 to 5, preferably from 2 to 3, where the acid used is selected from: hydrochloric, nitric and acetic acid, preferably the nitric acid.

III) Hydrolysis.

It consists of mixing the solution in an acid media obtained in the step II) under stirring and reflux conditions at a temperature of 70 to 80° C., stabilize the media and proceed with the addition of dropwise bidistilled water in a molar ratio of 1-2/0.100-0.150, preferably of 1-2/0.120-0.130 with an alkoxide/solvent molar ratio of 4-7/0.5-1.0, preferably 5-7/0.9-1.0 continuing with the reflux until the gel formation.

IV) Aging.

It consists of submitting the gel obtained in step III) to an aging treatment under the same stirring and reflux conditions of the step III) for 1 to 24 hours, preferably from 4 to 12 hours, for the complete formation of the nanostructured titania.

V) Drying.

It consists of drying the nanostructured titania obtained in step IV) at a temperature from 50 to 80° C. for 1 to 24 hours, preferably at 60-70° C. for 4 to 12 hours.

VI) Activation or Calcination.

It consists of submitting the dry nanostructured titania obtained in step V) to a calcination step, with the option of using an oxidizing or reducing atmosphere at a temperature of 200 to 600° C., for 1 to 12 hours, preferably at 300-500° C., for 3 to 9 hours.

Figure 2:
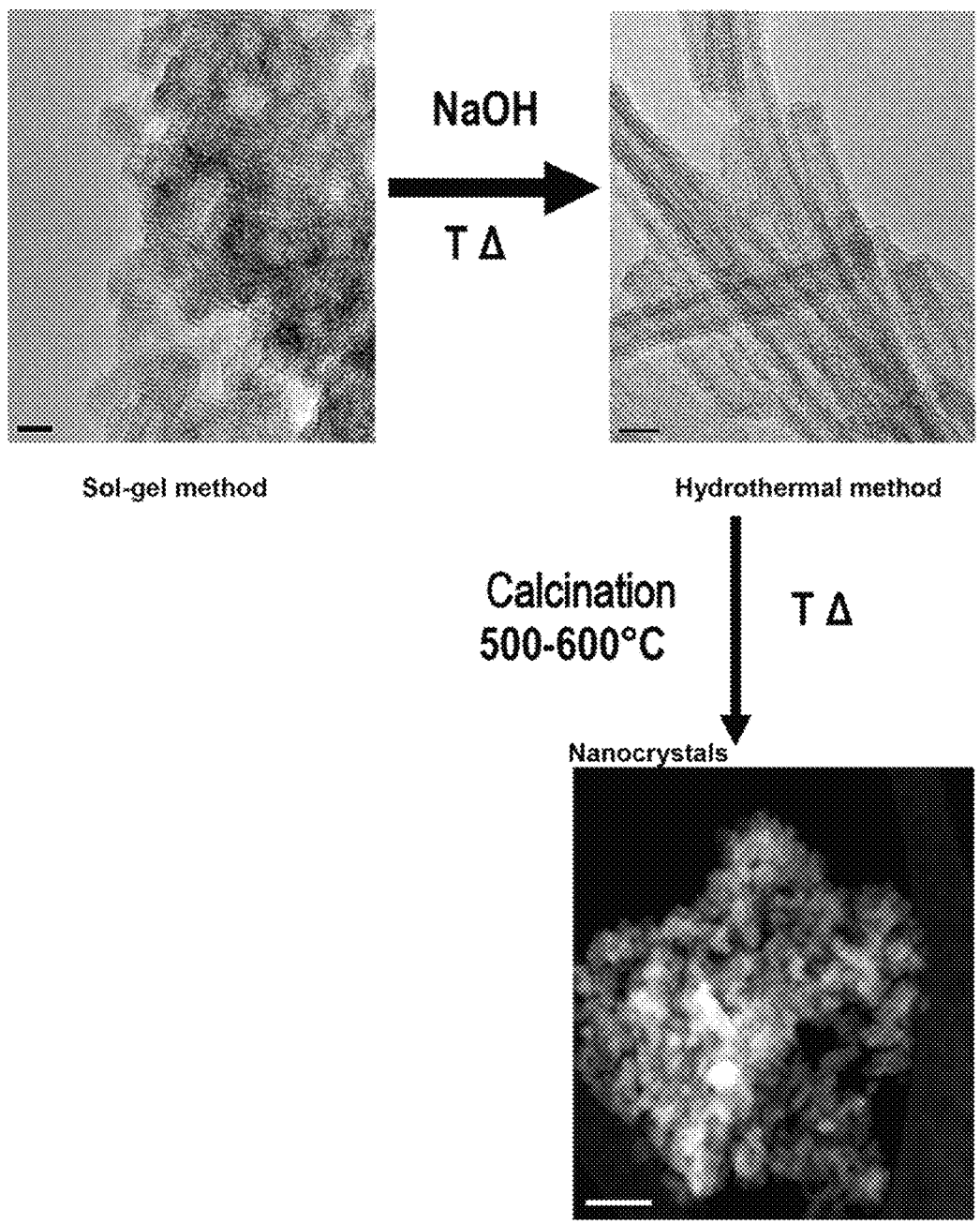
FIG. 2 shows the evolution of nanocrystals-nanotubes-nanocrystals transformation of the nanostructures based on the preparation steps of the TNT-IMP nanostructured titania catalysts obtained through the process of the present invention.
Figure 3:
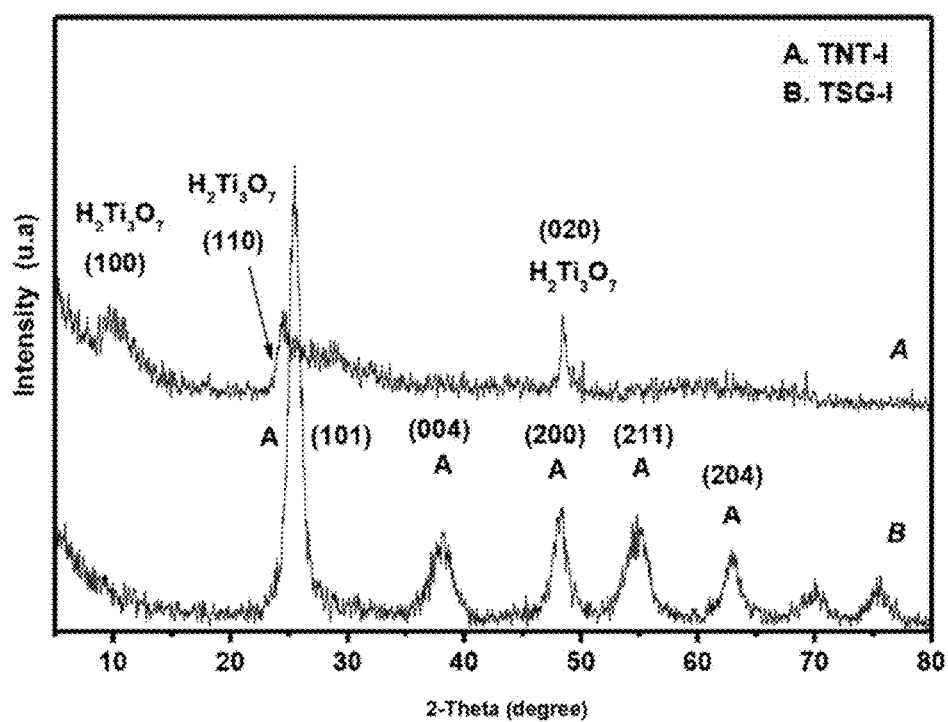
FIGS. 3 and 4 respectively are an XRD spectroscopy graphic of the TNT-IMP catalyst, fresh and calcinated at 400 to 600° C. where the phases can be observed, plans that contain this catalyst related to its respective thermal treatments obtained through the process of the present invention.
Figure 4:
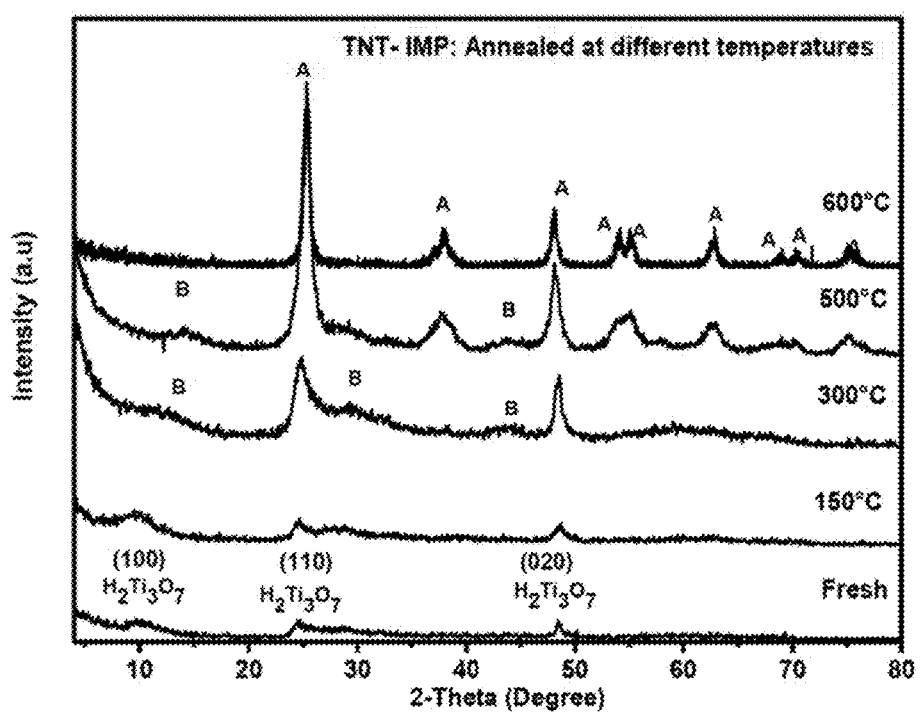
Figure 5:
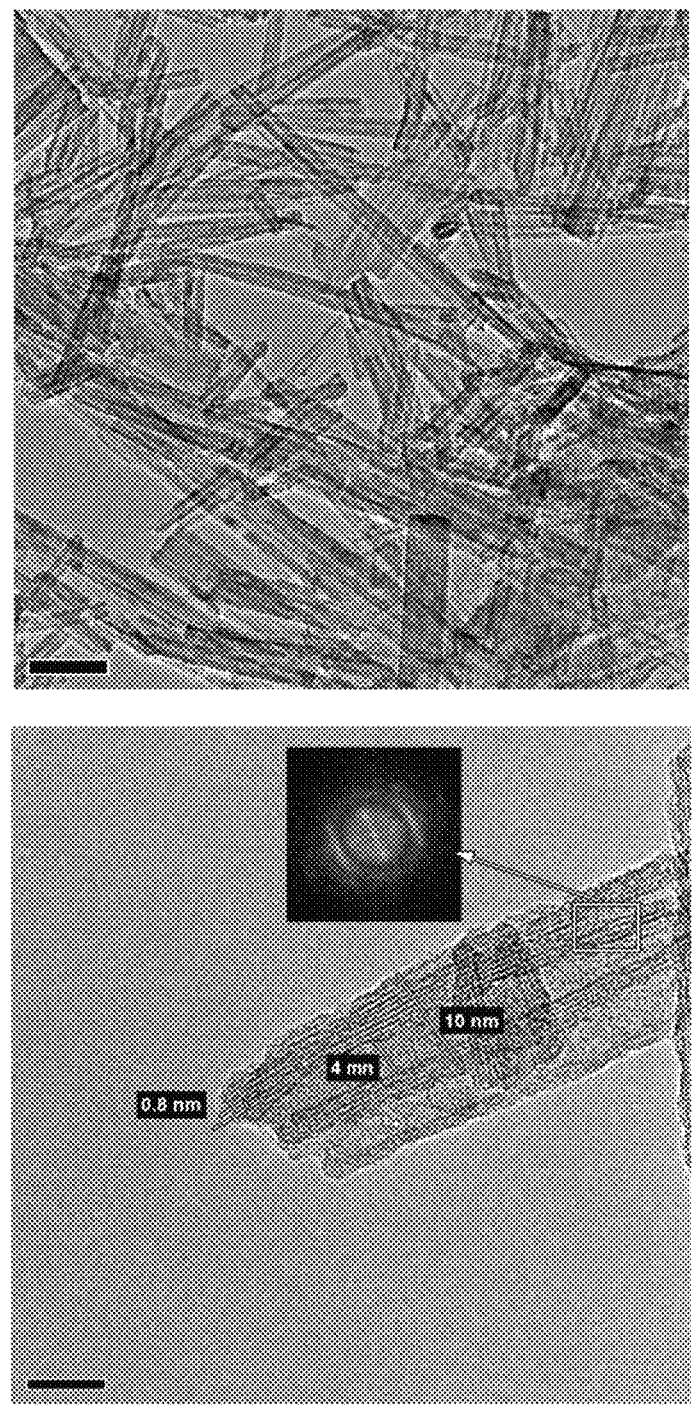
FIG. 5 are micrographs of High Resolution Transmission Electron Microscopy (HRTEM) showing the morphologic characteristics and dimensions of the nanotubes constituting the TNT-IMP catalyst, calcinated at 500° C.
Figure 6:
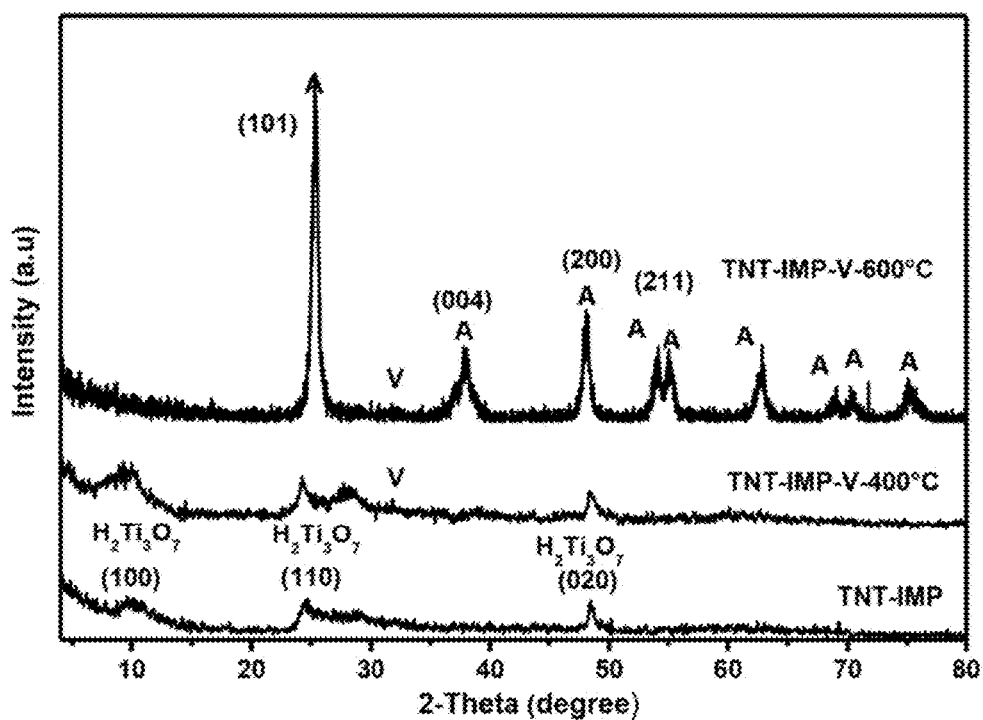
FIG. 6 is an XRD spectroscopy graphic of the TNT-IMP catalyst, fresh and calcinated at 400 and 600° C., showing the evolution of the phases and plans and identifying the vanadium contained in this catalyst related to its respective thermal treatments obtained through the process of the present invention.
Figure 7:
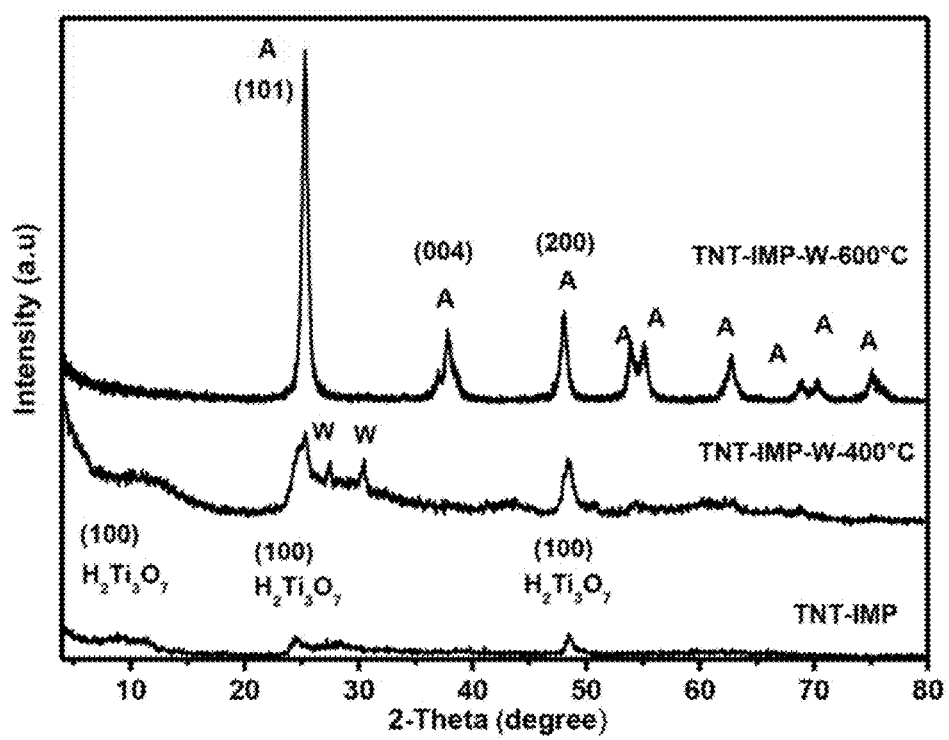
FIG. 7 is an XRD spectroscopy graphic of the TNT-IMP catalyst, fresh and calcinated at 400 and 600° C., showing the evolution of phases and plans can be observed, it identifies the tungsten contained in this catalyst related to its respective thermal treatments obtained through the process of the present invention.
Figure 8:
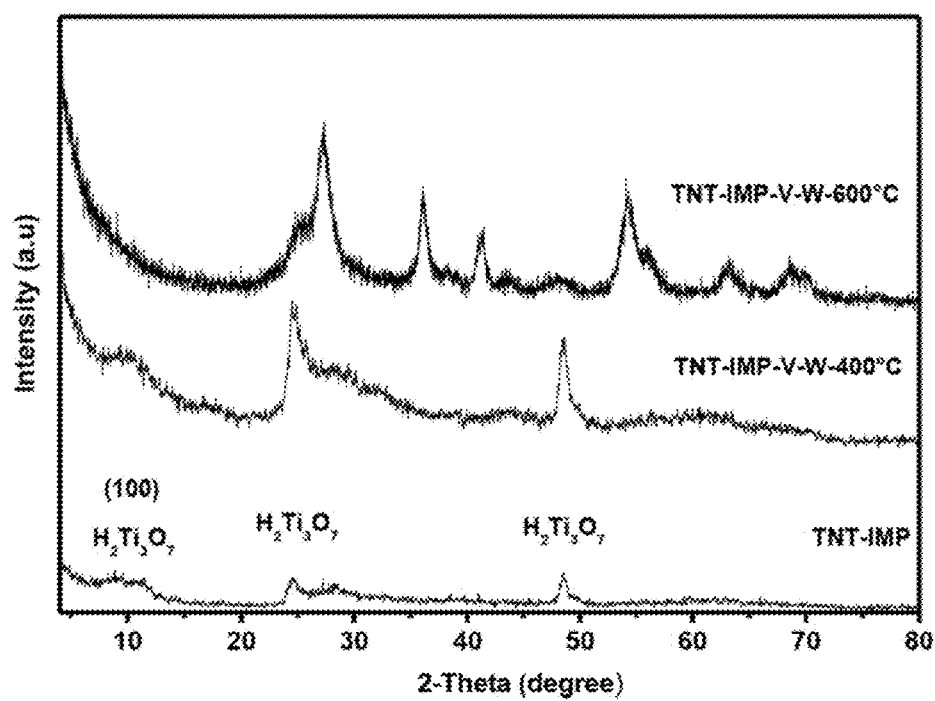
FIG. 8 is an XRD spectroscopy graphic of the TNT-IMP catalyst, fresh and calcinated at 400 and 600° C., showing the evolution of phases and plans can be observed, and identifies the vanadium and tungsten contained in this catalyst related to its respective thermal treatments obtained through the process of the present invention.
Figure 9:
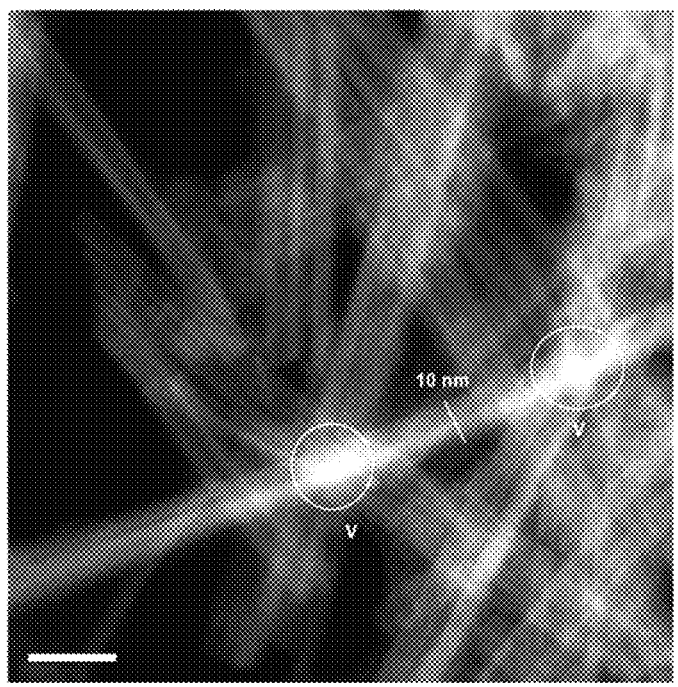
FIG. 9 are micrographs of High Resolution Transmission Electron Microscopy (HRTEM), showing the high and homogeneous dispersion of vanadium as an active metal, can be observed, in the nanotubes phase (TNT-IMP) (50 nm) and activated at a high temperature (600° C.) (5 nm), obtained through the process of the present invention.
Figure 9:
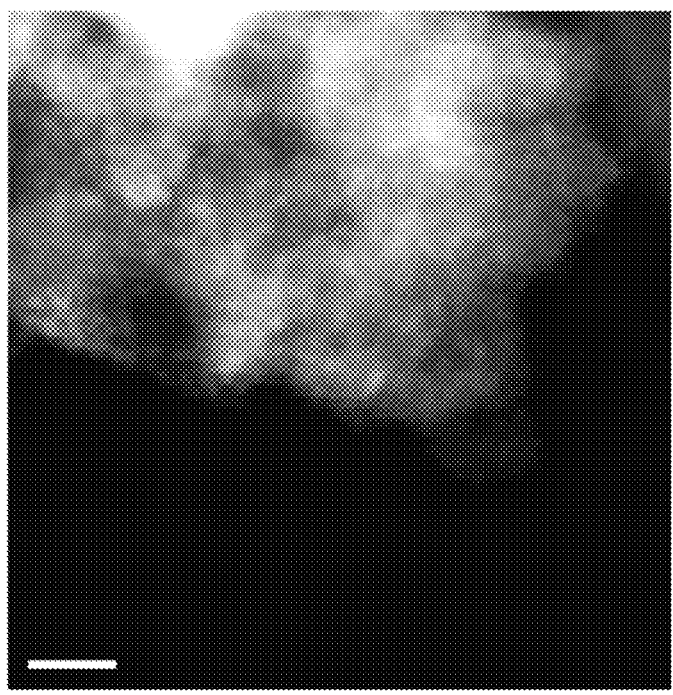
Figure 10:
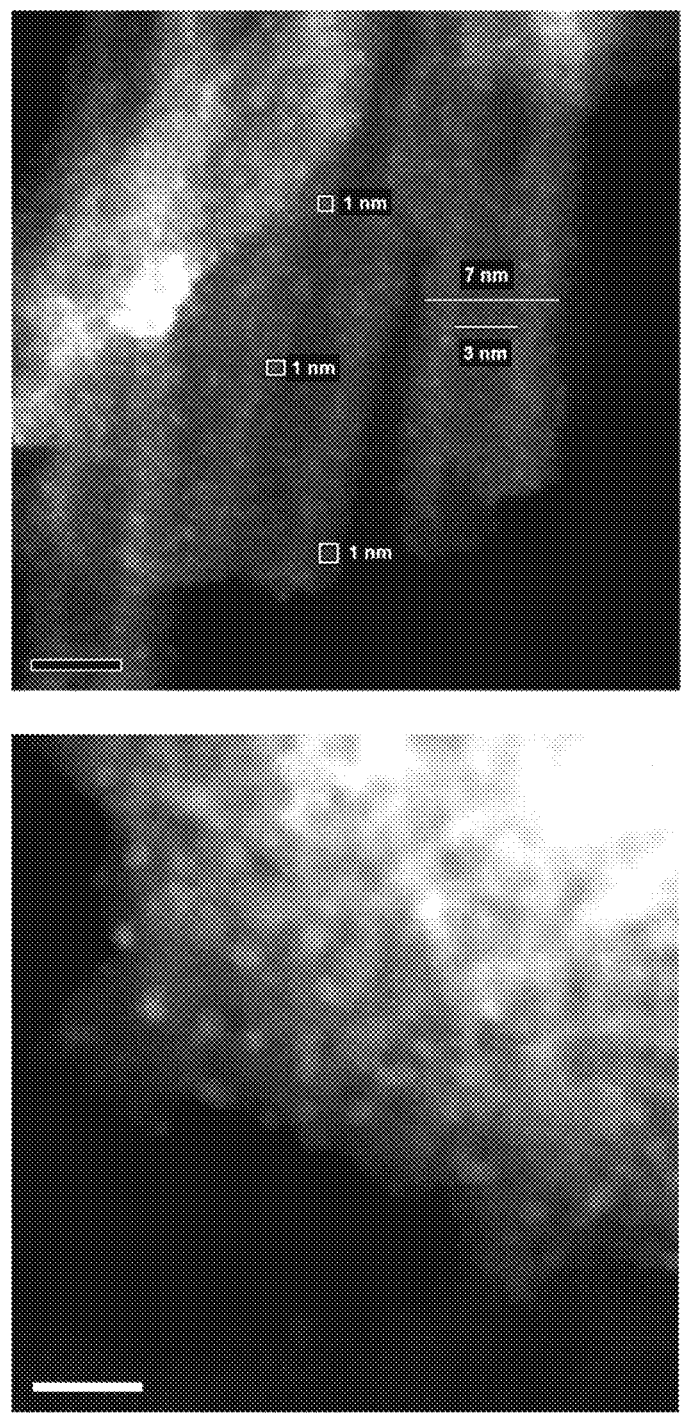
FIG. 10 are micrographs of High Resolution Transmission Electron Microscopy (HRTEM), showing the high and homogeneous dispersion of tungsten as an active metal, can be observed, in the nanotubes phase (TNT-IMP) (5 nm) and activated at a high temperature (600° C.) (10 nm), obtained through the process of the present invention.
Figure 11:
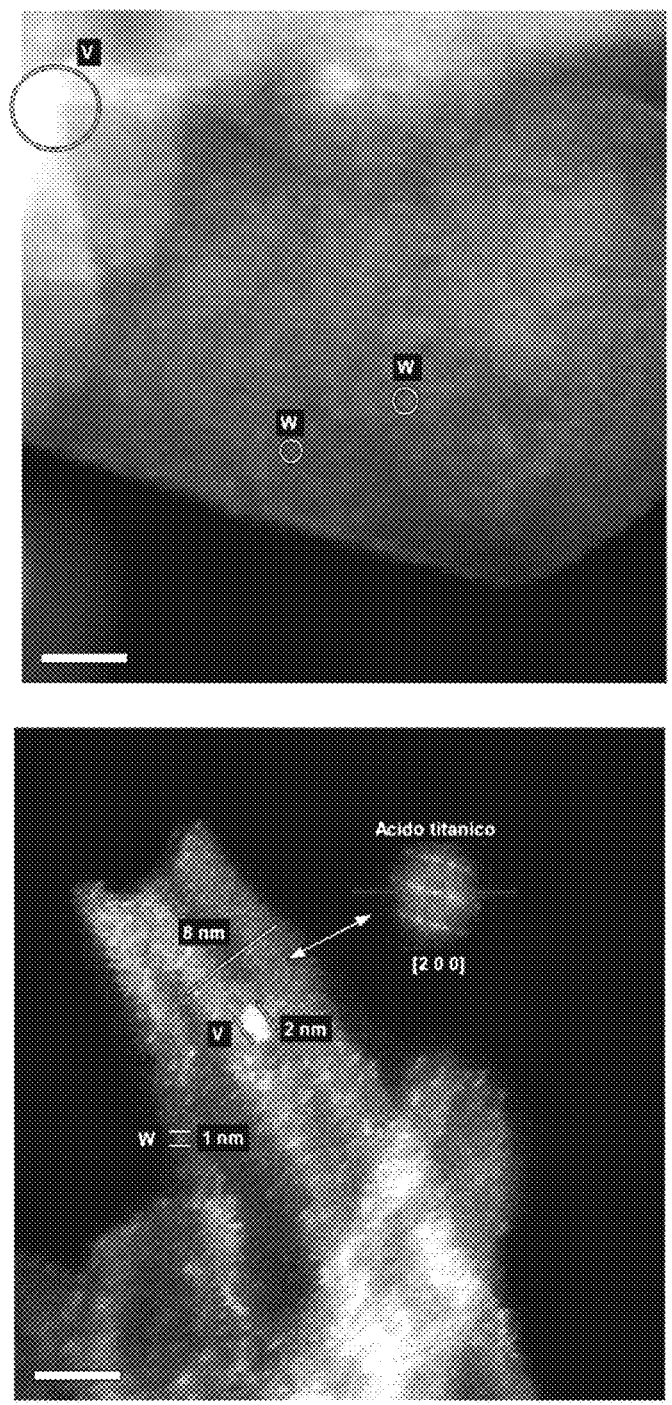
FIG. 11 are micrographs of High Resolution Transmission Electron Microscopy (HRTEM), showing the high and homogeneous dispersion of vanadium and tungsten as active metals, can be observed, in the nanotubes phase (TNT-IMP) (5 nm) and activated at a high temperature 500° C., obtained through the process of the present invention.

For a better comprehension of the invention in the second step of the process for obtaining TNT-IMP catalyst; FIG. 2 shows a scheme of evolution of nanocrystals-nanotubes-nanocrystals nanostructures for thermal effect once the nanotubes are obtained.

Second STEP Hydrothermal Process
I). Normality of the alkaline solution (NaOH);
II). Reaction temperature;
III). Time and stirring of the reaction;
IV). Washing; and
V). Activation or calcination.

I) Normality of the Alkaline Solution (NaOH).

It consists of mixing the nanostructured titania with a solution of sodium hydroxide 5 to 10N (NaOH) with stirring at 100 to 200 rpm, at a temperature of 130 to 180° C. during the drying obtained in step V) to a calcination step, with the option of using an oxidizing and reducing atmosphere, at a temperature of 200 to 600° C. for 1 to 12 hours, preferably at 300-500° C. for 3 to 9 hours.

II) Reaction Temperature.

It consists of submitting the nanostructured titania mixed with a solution of sodium hydroxide 5 to 10 N at a temperature range of 130 to 180° C.

III) Reaction Time and Stirring.

It consists of submitting the nanostructured titania mixed with a sodium hydroxide 5 to 10N solution at a temperature range of 130 to 180° C. for 12 to 24 hours is with stirring at 100 to 200 rpm.

IV) Washing.

It consists of submitting the nanostructured titania, once carried out the steps I, II and III, to the washing process with hydrochloric acid (HCl), to obtain an acid pH of 1 to 3, afterwards, the second washing with water is carried out to obtain a pH from 6 to 7.

V) Activation or Calcination.

It consists of submitting the nanostructured titania, once carried out the steps I, II, III and IV, to a thermal drying treatment at 70 to 80° C., once dried, it is submitted to thermal calcination treatment at 100 to 600° C. The heating profile is of 5° C. per minute. The nanostructured titania is obtained with two calcination profiles; at 350° C. and 600° C., when these temperatures are obtained, are maintained for 1 to 4 hours.

The third step corresponding to the evolution of the nanostructures, i.e., the evolution of titania nanotubes to nanocrystals only by thermal effect, i.e. by the calcination process, with or without the incorporation of metals or active metals. Examples of metals include vanadium and tungsten added as metal salt precursors.

The TNT-IMP nanostructured titania catalyst obtained through the process of the present invention mainly has the following properties at different activation temperature:

The physicochemical properties, mainly the morphological properties of the TNT-IMP nanostructured titania are shown in the following tables:

Table 1 shows that the TNT-IMP nanostructured titania is constituted by proportions of crystalline/amorphous phases: hydrogen titanates and titanates/anatase combination.

TABLE 1

Proportion of the crystalline/amorphous phases in nanostructures of the TNT-IMP nanostructured titania.

| Activation Temperature (° C.) | Crystalline/Amorphous Phase (wt %) General/(Preferable) | |
|---|---|---|
| | Hydrogen titanates | Hydrogen titanates/Anatase |
| 100-350 | 95-100 (98-100) | 96/04 (97/03) |
| 350-600 | 20-33 (21-30) | 22/78 (23/77) |

The morphologic properties related to purity and stability of the TNT-IMP nanostructured titania gives to special characteristics of support this material, distribution and interaction with the incorporated active materials.

The TNT-IMP nanostructured titania has structure characteristics $D_i$ (>100 nm) with internal, external and interlaminar diameters range shown in Table 2.

TABLE 2

Dimensions of the external diameters ($D_e$), internal diameters ($D_i$) and interlaminar diameters ($E_i$) of the TNT-IMP nanostructured titania catalysts.

| Activation Temperature (° C.) | Hydrogen titanates (nm) General/(Preferable) | | |
|---|---|---|---|
| | $D_e$ | $D_i$ | $E_i$ |
| 100-350 | 8-10 (8-9) | 4-6 (5-6) | 0.6-0.8 (0.6-0.7) |

TABLE 2-continued

Dimensions of the external diameters ($D_e$), internal diameters ($D_i$) and interlaminar diameters ($E_i$) of the TNT-IMP nanostructured titania catalysts.

| Activation Temperature (° C.) | Hydrogen titanates (nm) General/(Preferable) | | |
|---|---|---|---|
| | $D_e$ | $D_i$ | $E_i$ |
| 350-600 | 5-7 (5-6) | 2-17 | 0.1-0.2 |

In the evolution of nanotubes to nanocrystals of the TNT-IMP nanostructured titania catalyst, the characteristics of the dimensions are shown in Table 3.

TABLE 3

Dimension of the crystals of the TNT-IMP nanostructured titania catalyst, nanotubes-nanocrystals evolution.

| Activation Temperature (° C.) | Dimension of the crystals (nm) | |
|---|---|---|
| | General | Preferable |
| 350-600 | 12-66 | 12-15 |

The texture properties related to surface area, volume distribution and pore diameter of the TNT-IMP nanostructured titania catalyst, that similarly has a special effect in its catalytic properties, are shown in Table 4.

TABLE 4

Texture properties of the TNT-IMP nanostructured titania catalyst.

| Activation Temperature (° C.) | Surface area (m²/g) | | Average Pore Diameter (Å) | |
|---|---|---|---|---|
| | General | Preferable | General | Preferable |
| 100-350 | 320-350 | 330-340 | 20-55 | 30-40 |
| 350-600 | 200-280 | 260-270 | 20-30 | 20-25 |

The texture properties of Table 4, related to surface area and pore diameter of the TNT-IMP nanostructured titania catalyst, give special properties to support and distribute active metals.

The Effect Called "Quantum Size Effect".

The dimension of the nanostructure size in its evolution from TNT-IMP nanostructured titania catalyst relies on the physicochemical properties of the same, and particularly on the effect called "quantum size effect" related to the electronic properties, mainly referring to the bandgap energy, also known as bandgap (Eg) that particularly in semiconductor materials is the one handling the dynamic of the formation of the hole-electron pair in which the efficiency depends on the redox process where it will be applied.

Commonly, in semiconductor materials, the objective is to decrease Eg, but in case of the TNT-IMP catalyst, this value is special since there is a structure change from nanocrystal to nanotube and this type of incidence is nanometrically structured in the Eg value.

Based on the above, the TNT-IMP nanostructured titania catalyst in the Table 5 shows the Eg Values by the type of structure.

TABLE 5

Values of the bandgap energy (Eg) of the
nanostructures of the TNT-IMP semiconductor material.

| Activation Temperature (° C.) | Bandgap energy (Eg) (eV) | |
| --- | --- | --- |
| | General | Preferable |
| 100-350 | 2.83-3.80 | 2.83-2.85 |
| 350-600 | 2.90-3.95 | 2.90-2.93 |

The property related to Eg value of the TNT-IMP nanostructure titania catalyst gives special redox properties for its use as a support or catalyst in catalytic processes.

Hydroxylation Degree

The type of structure and nanometric dimension of the TNT-IMP nanostructure titania catalyst also particularly relies on the hydroxylation degree as a morphologic property, as shown in Tables 6 to 9.

TABLE 6

Refined deconvolution of the OH hydroxyl group
area, determined at 300° C. for the TNT-IMP catalyst.

| Peak | Area |
| --- | --- |
| 1 | 3.90 |
| 2 | 3.79 |
| 3 | 1.33 |
| Total area: | 9.2 |

TABLE 7

Refined deconvolution of the OH hydroxyl group
area, determined at 600° C. for the TNT-IMP catalyst.

| Peak | Area |
| --- | --- |
| 1 | 2.56 |
| 2 | 1.15 |
| 3 | 0.71 |
| Total area: | 5.6 |

Table 8 shows as a reference, the deconvolution values of the OH hydroxyl group area determined at 300° C. for Commercial Titania Degussa P25 activated at 600° C.

TABLE 8

Refined deconvolution of OH hydroxyl group
area, determined at 300° C. for Commercial Titania Degussa P25,
activated at 600° C.

| Peak | Area |
| --- | --- |
| 1 | 0.12597 |
| 2 | 0.40968 |
| 3 | 0.40857 |
| 4 | 0.05357 |
| Total area: | 0.00779 |

The above implies that the TNT-IMP catalyst of the present invention considerably improves the interaction degree of the OH groups on the surface (Hydroxylation Degree), which is a very important characteristic in catalytic properties in hydroxylation degree range shown in Table 9.

TABLE 9

Hydroxylation grade of the TNT-IMP catalyst at
different activation temperatures.

| Sample | Activation temperature (° C.) | Hydroxylation grade* |
| --- | --- | --- |
| TNT-IMP | 300 | 9.133-12.011 |
| TNT-IMP | 600 | 4.933-5.669 |
| Commercial TiO$_2$** | 600 | 0.99779 |

*Deconvolutions determined at 300° C.
**Commercial Titania Degussa P 25

The TNT-IMP nanostructured titania catalyst can be mainly used:

a) As a support of active metals or as a catalyst itself;

b) In heterogeneous and homogeneous catalytic processes for the reduction of contaminants present in gaseous and/or aqueous emissions through thermal of photoassisted processes;

c) As a covering of catalytic matrixes, such as ceramic and/or metallic monoliths elaborated with different type of materials; such catalytic matrixes can have different geometric bodies, as well as different types and arrangements of cells and channels, in order to make efficient both the contact and the times of the contact;

d) As a film over different types of substrates; glass, metal, polymers, etc.

e) Alone or incorporated with active metals in order to control the emissions of contaminants present in gaseous or aqueous emissions applying heterogeneous or homogeneous catalytic processes.

EXAMPLES

Some practical examples to have a better understanding of the present invention without limiting its scope are disclosed.

Example 1

In order to obtain TNT-IMP catalyst, mix 3.0 g of previously synthetized TiO$_2$ anatase nanocrystals obtained by the sol-gel method in a Parr autoclave using 2-propanol as a solvent and a titanium iso-propoxide precursor with 7 nm crystal size, anatase phase, a specific area of 200 m$^2$/g, a pore volume of 0.17 cm$^3$/g and a pore diameter of 36 Å applying the hydrothermal procedure mixing with a solution of 5 and 10 N sodium hydroxide (NaOH) at a temperature range of 130 to 180° C. for 24 hours at 200 rpm with autogenous pressure. After 24 hours have elapsed, wash the product with HCl to obtain an acid pH of 2 to 3, afterwards the material is washed with sufficient deionized water to remove chloride ions and to obtain a pH from 6 to 7. The obtained materials are dried for 12 hours at 80° C. The obtained catalyst was identified as TNT-IMP.

Example 2

The catalyst obtained in Example 1 was calcined at 350° C. for 4 hours in an oxidizing atmosphere. A second step of calcination was carried out from 350° C. to 600° C. The obtained catalyst was identified as TNT-IMP and its texture and morphological properties are shown in Tables 1 to 9 as well as in FIGS. 1 to 5.

Example 3

In order to obtain TNT-IMP catalyst, 3.0 g of previously synthetized TiO$_2$ anatase nanocrystals obtained by the sol-gel method in a Parr autoclave using 1-butanol as a solvent and a titanium butoxide precursor with 8 nm crystal size, anatase phase, a specific area of 190 m²/g, a pore volume of 0.15 cm³/g and a pore diameter of 40 Å. This material, under the hydrothermal method procedure, was mixed with a solution of sodium hydroxide (NaOH) 5 and 10 N at a temperature range of 130 to 180° C. for 24 hours at 200 rpm with an autogenous pressure. After 24 hours have elapsed, the product was washed with HCl to obtain an acid pH of 2 to 3, afterwards the material is washed with sufficient deionized water to remove chloride ions and to obtain a pH from 6 to 7. The obtained materials are dried for 12 hours at 80° C.

Example 4

The catalyst obtained in Example 3 was taken to the calcination process at 500° C. for 4 hours in an oxidizing atmosphere. The obtained catalyst was identified as TNT-IMP and its texture and morphological properties are shown in Tables 1 to 9 as well as in the FIGS. 1 to 5.

Example 5

To the catalyst obtained according to the procedure of Example 1, vanadium, as active metal, was added. The procedure consists on placing from 1 to 5 grams of TNT-IMP catalyst into a glass reactor adding drop by drop 80 to 400 mL of ammonium metavanadate solution to obtain percentages in the range of 3, 5 and 10% by weight of vanadium in the catalyst. In this step, an incipient wet metal incorporation metal is used. After the impregnation of the catalyst, it is washed with deionized water to obtain a pH between 6 and 8. The obtained catalysts are dried for 12 hours at 80° C. The obtained catalyst was identified as TNT-IMP.

Example 6

The catalyst obtained in Example 5 was taken to the calcination process at 500° C. for 4 hours in oxidizing atmosphere. The obtained catalyst was identified as TNT-IMP and its texture and morphological properties are shown in Tables 1 to 9 as well as in the FIGS. 1 to 5.

Example 7

To the catalyst obtained according to the procedure of Example 5, tungsten was added. The procedure consists of placing from 1 to 5 grams of TNT-IMP catalyst of Example 5 into a glass reactor adding drop by drop 80 to 400 mL of tungstic acid to obtain percentages in the range of 3, 5 and 10% by weight of tungsten in the catalyst. In this step, an incipient wet metal incorporation metal is used. After the impregnation of the catalyst, it is washed with deionized water to obtain a pH between 6 and 8. The obtained catalysts are dried for 12 hours at 80° C. The obtained catalyst was identified as TNT-IMP.

Example 8

The catalyst obtained in Example 7 was taken to the calcination process at 500° C. for 4 hours in an oxidizing atmosphere. The obtained catalyst was identified as TNT-IMP and its texture and morphological properties are shown in Tables 1 to 9 as well as in the FIGS. 1 to 5.

Example 9

Figure 12:
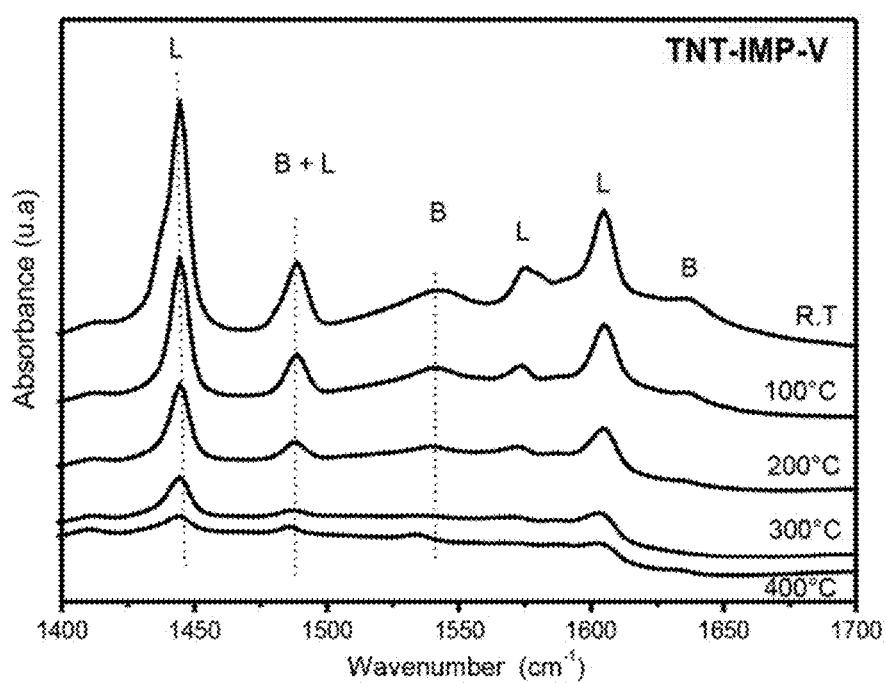
FIG. 12 is a FTIR spectrum of the TNT-IMP catalyst, with the incorporation of vanadium, where the conservation of acid sites of Lewis and Brönsted types is observed, in a temperature range of 100 to 400° C., obtained through the process of the present invention.
Figure 13:
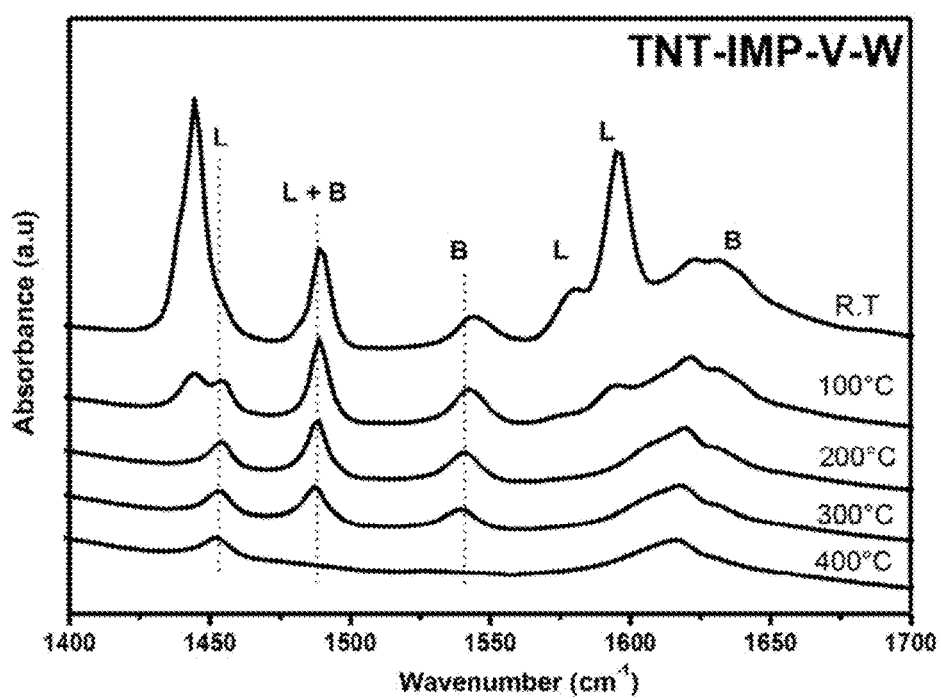
FIG. 13 is a FTIR spectrum of the TNT-IMP catalyst, with the incorporation of vanadium and tungsten, where the conservation of acid sites of Lewis and Brönsted types is observed, in a temperature range of 100 to 400° C., obtained through the process of the present invention.

The catalysts obtained in Examples 6 and 8 were taken to the calcination process at 500° C. for 4 hours in oxidizing atmosphere. The obtained catalysts were identified as TNT-V-IMP and TNT-VW-IMP and its properties of acid sites types and stability at high temperature are shown in FIGS. 12 and 13.

What is claimed is:

1. A nanostructured titania catalyst with stabilized acidity comprising titanium dioxide nanocrystals having crystalline/amorphous phase containing hydrogen titanate and a hydrogen titanate/anatase combination,
    wherein said catalyst is obtained by a process including a sol-gel method step to obtain hydrogen titanate nanocrystals, a hydrotreatment step of the hydrogen titanate nanocrystals to obtain titanium dioxide nanotubes, and thermal activation step to convert at least a portion of the resulting titanium dioxide nanotubes to titanium dioxide nanocrystals,
    wherein said thermal activation step is at a temperature of 100-350° C. and said catalyst comprises titanium dioxide nanocrystals having crystalline/amorphous phase containing 95-100 wt % of hydrogen titanate and further containing combination of 96 wt % of hydrogen titanate and 4 wt % of anatase; or
    wherein said thermal activation step is at a temperature of 350-600° C. and said catalyst comprises titanium dioxide nanocrystals having crystalline/amorphous phase containing 20-33 wt % of hydrogen titanate and further containing combination of 22 wt % of hydrogen titanate and 78 wt % of anatase.

2. A nanostructured titania catalyst with stabilized acidity according to claim 1, wherein said catalyst has internal, external and interlaminar diameter ranges as follows:

| Activation Temperature | Dimensions of the external diameters (De), internal diameters ($D_i$) and interlaminar diameters ($E_i$) of the TNT-IMP nanostructured titania catalysts | | |
|---|---|---|---|
| | Hydrogen titanates (nm) General/(Preferable) | | |
| (° C.) | $D_e$ | $D_i$ | $E_i$ |
| 100-350 | 8-10 (8-9) | 4-6 (5-6) | 0.6-0.8 (0.6-0.7) |
| 350-600 | 5-7 (5-6) | 2-17 (1.5-2) | 0.1-0.2 (0.06-01). |

3. A nanostructured titania catalyst with stabilized acidity according to claim 2, wherein said catalyst has the following texture properties:

| Activation Temperature | Surface area (m²/g) | | Average Pore Diameter (A) | |
|---|---|---|---|---|
| (° C.) | General | Preferable | General | Preferable |
| 100-350 | 320-350 | 330-340 | 20-55 | 30-40 |
| 350-600 | 200-280 | 260-270 | 20-30 | 20-25. |

4. A nanostructured titania catalyst with stabilized acidity according to claim 3 wherein said catalyst has the following properties of the bandgap energy (Eg):

Values of the bandgap energy (Eg) of the nanostructures
of the TNT-IMP semiconductor material

| Activation Temperature (° C.) | Bandgap energy (Eg) (eV) | |
|---|---|---|
| | General | Preferable |
| 100-350 | 2.83-3.80 | 2.83-2.85 |
| 350-600 | 2.90-3.95 | 2.90-2.93 |

5. A nanostructured titania catalyst with stabilized acidity according to claim 4, wherein said catalyst has the following hydroxylation grades:

| Hydroxylation grade of catalyst at different activation temperatures: | |
|---|---|
| Activation temperature (°) | Hydroxylation grade* |
| 300 | 9.133-12.011 |
| 600 | 4.933-5.669 |
| 600 | 0.99779 |

*Deconvolutions determined at 300° C.

6. A nanostructured titania catalyst with stabilized acidity according to claim 1, wherein said catalyst is obtained by the process comprising the steps of:
a sol-gel method step
I) preparation of an alcohol solution as a preparation of a feeding charge and consists of an addition of a reflux system with stirring consisting of a titanium alkoxide having three or four branched or lineal carbons in an alcohol solution, with three or four lineal or branched carbon alcohols;
II) forming a solution in acid media by adding an acid to the alcohol solution obtained in step I) controlling pH from 1 to 5, where the acid used is selected from the group consisting of hydrochloric, nitric, and acetic acid;
III) hydrolysis by mixing the solution of step II in an acid media obtained in step II) under stirring and reflux conditions at a temperature of 70 to 80° C., stabilize the resulting mixture and adding dropwise bidistilled water in a molar ratio of 1-2/0.100-0.150, continuing with the reflux until gel formation;
IV) aging by submitting the gel obtained in step III) to an aging treatment under the same stirring and reflux conditions of step III) for 1 to 24 hours for formation of a nanostructured titania;
V) drying the nanostructured titania obtained in step IV) at a temperature of 50 to 80° C. for 1 to 24 hours;
VI) activation or calcination by submitting the dry nanostructured titania obtained in step V) to a calcination step, optionally with an oxidizing or reducing atmosphere at a temperature of 200 to 600° C., for 1 to 12 hours to obtain titanium dioxide nanocrystals; and
a hydrothermal process step
I) normality of an alkaline solution (NaOH) by mixing the titanium dioxide nanocrystals with a solution of sodium hydroxide 5 to 10N (NaOH) with stirring at 100 to 200 rpm, at a temperature of 130 to 180° C. during the drying obtained in step V) to a calcination step, optionally with an oxidizing and reducing atmosphere, at a temperature of 200 to 600° C. for 1 to 12 hours;
II) reaction temperature by subjecting the titanium dioxide nanocrystals mixed with a solution of sodium hydroxide 5 to 10 N at a temperature range of 130 to 180° C.;
III) reaction time and stirring by submitting the titanium dioxide nanocrystals mixed with a sodium hydroxide 5 to 10N solution in a temperature range of 130 to 180° C. for 12 to 24 hours with stirring at 100 to 200 rpm to obtain titanium dioxide nanotubes;
IV) washing by submitting the titanium dioxide nanotubes obtained by the steps I, II and III, to a washing process with hydrochloric acid (HCl), up to obtain an acid pH of 1 to 3, afterwards a second washing with water is carried out up to obtain a pH from 6 to 7; and
V) activation or calcination by submitting the titanium dioxide nanotubes of step IV, to a thermal drying treatment at 70 to 80° C., once dried, submitting to thermal calcination treatment at 100 to 600° C., at a heating profile of 5° C. per minute, to obtain nanostructured titanium dioxide nanocrystals with two calcination profiles at 350° C. and 600° C., when these temperatures are obtained, are maintained for 1 to 4 hours to obtain said titanium dioxide nanocrystals.

7. The nanostructured titania catalyst according to claim 6, wherein the titanium alkoxide used in step I) has three or four branched or linear carbons.

8. The nanostructured titania catalyst according to claim 7, wherein the preparation of the solution in the acid media from the step II) is carried out with a pH from 2 to 3.

9. The nanostructured titania catalyst according to claim 8, wherein the preparation of the acid media solution of step II) is carried out with nitric acid.

10. The nanostructured titania catalyst according to claim 6, wherein the water/alkoxide molar ratio used in the step III) is 1-2/0.120-0.130.

11. The nanostructured titania catalyst according to claim 6, wherein the drying of the step V) is carried out at 60-70° C. for 4 to 12 hours.

12. The nanostructured titania catalyst according to claim 6, wherein the activation or calcination of the step VI) is carried out at 300-500° C. for 3 to 9 hours.

13. The nanostructured titania catalyst according to claim 6, wherein the NaOH solution of the step I) is 5 to 10 N.

14. The nanostructured titania catalyst according to claim 6, wherein the reaction temperature of the step II), is carried out at 130 to 180° C.

15. The nanostructured titania catalyst according to claim 6, wherein the stirring time of the step III), is 12 to 24 hours with a stirring at 100 to 200 rpm.

16. The nanostructured titania catalyst according to claim 6, wherein the washing of the step IV) is carried out with HCl to obtain a pH of 1 to 3.

17. The nanostructured titania catalyst according to claim 6, wherein the washing of the step IV) is carried out with deionized water with a pH of 6 to 7.

18. The nanostructured titania catalyst according to claim 6, wherein the activation or calcination of the step VI) is carried out at 350-600° C. for 1 to 4 hours.

19. A nanostructure titania catalyst support with stabilized acidity according to claim 1, as a support of active metals in heterogeneous or homogeneous catalytic processes; as a covering of catalytic matrixes; as a film over different types of substrates and optionally with active metals.

20. The nanostructured titania catalyst of claim 1, wherein said catalyst is obtained by thermal activation at a temperature of 350-600° C. and where said catalyst comprises 20-33 wt % of hydrogen titanate.

21. The nanostructure titania catalyst of claim 1, wherein said catalyst is obtained by an activation temperature of 100-350° C. and said catalyst comprises 95-100 wt % of hydrogen titanate.

22. The nanostructure titania catalyst of claim 21, wherein said catalyst further comprising combination of titanate/anatase including 96 wt % of hydrogen titanate and 4 wt % of anatase, and has a surface area of 320-350 m2/g and an average pore diameter of 20-40 angstroms.

23. The nanostructure titania catalyst of claim 20, wherein said catalyst further comprising combination of hydrogen titanate/anatase including 22 wt % hydrogen titanate and 78 wt % anatase, and has a surface area of 200-280 m2/g and an average pore diameter of 20-30 angstroms.

\* \* \* \* \*